Sept. 13, 1927.  I. C. WOODWARD  1,642,285
WHEEL PULLER
Filed Oct. 26, 1926
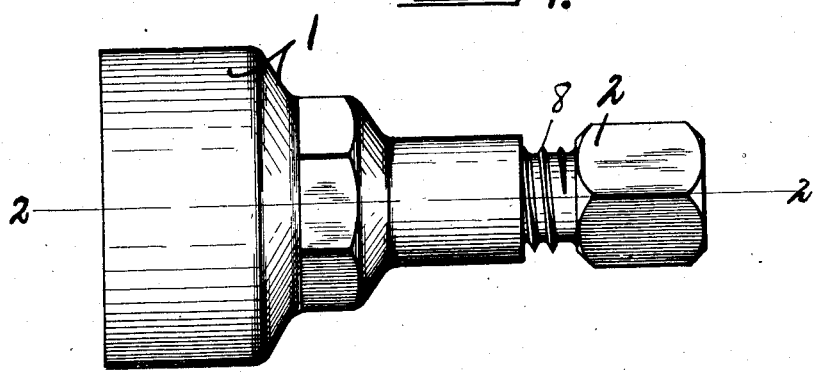
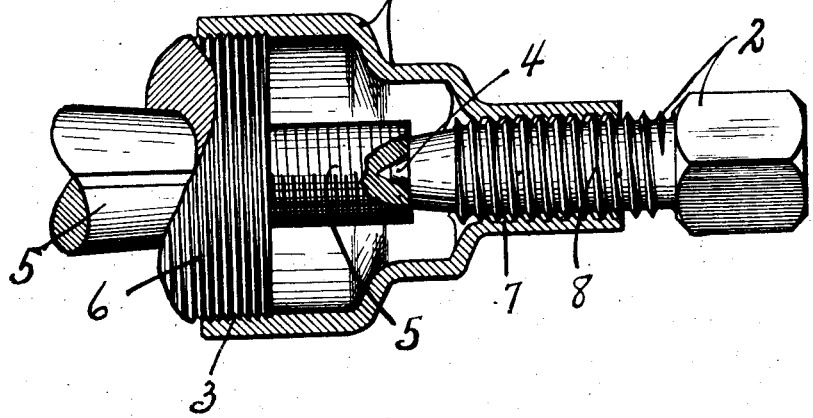
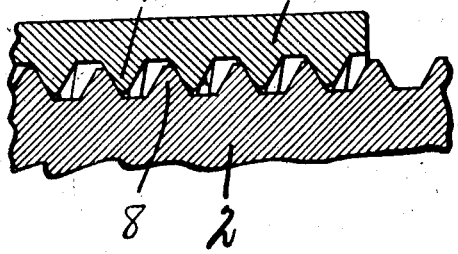
INVENTOR.
Irving C. Woodward
BY
Denison Thompson
ATTORNEYS.
WITNESS Patented Sept. 13, 1927.

1,642,285

UNITED STATES PATENT OFFICE.

IRVING C. WOODWARD, OF SYRACUSE, NEW YORK.

WHEEL PULLER.

Application filed October 26, 1926. Serial No. 144,259.

This invention relates to certain new and improved wheel puller.

The main object of the invention is to provide a comparatively simple and powerful device, easily applied and removed, and easily operated in pulling a wheel off its axle, or in so loosening the wheel by shock as to permit its ready removal from the axle.

A further advantage of the invention resides in the fact that the structure is formed of materials of such inherent resiliency as to assist in the operation of the structure.

Other objects and advantages relate to the details of the structure and the parts thereof, all as will more fully appear from the following description, taken in connection with the accompanying drawings, in which:

Figure 1 is an elevation of a wheel puller of this invention.

Figure 2 is a section on line 2—2, Figure 1.

Figure 3 is an enlarged section showing the form and relation of the special threads.

The wheel puller as here disclosed consists solely of two parts, viz, a cap —1— and screw —2—. The inner end of the cap —1— is internally threaded as at —3— so that it can be screwed upon the hub —6— of an automobile wheel. The outer end of the cap is in this particular illustration considerably reduced in size as compared with the inner end and is formed upon its interior surface with a special thread —7—, and in like manner the screw —2— is formed with a similar special thread —8— upon its outer surface for cooperation with the special thread upon the interior of the outer end of the cap —1—.

The removal of a wheel from its axle is most readily effected by the application of a sudden shock, and various means permitting the application of such shock has been designed, but the present structure differs materially from previous devices in that it consists of two parts which are threaded together, but in which a limited relative movement of the parts axially of the screw is permitted by the use of a special thread upon the cap and a special thread upon the screw so formed that the threads are capable of limited movement in the grooves between the threads axially of the screw.

For illustration, the threads themselves may be cut of a size normally used in producing a threaded member having sixteen threads to the inch, but in this structure they are so spaced as to produce only eight threads to the inch, leaving the groove or channel between the threads considerably wider than the threads themselves. If the base of the channel between the threads is .060 in width and the flat surface at the outer portion of the threads is .015 in width, the pitch of all threads being the same, the screw and casing may have a relative axial movement of approximately .045 of an inch, permitting the application of the desired shock to the wheel. However, these specific figures are merely illustrative.

With this structure, the cap —1— may be threaded upon the hub of a wheel and the screw —2— threaded inwardly until its inner end contacts with the outer end of the axle —5—.

The outer end of the screw may then be struck by a suitable implement and as the special threads upon the screw and cap permit limited axial movement of the screw, the sudden shock or jar applied to the axle is considerably more effective in loosening the wheel from the axle than the application of a steady pressure or pull. Further, the cap or casing —1— being formed of sheet metal, has in itself sufficient inherent resiliency so as to keep pressure on the end of the axle after the wheel has started to come off.

Altho I have shown and described a specific structure together with the form and relation of the parts as illustrated I do not desire to limit myself to the exact details of form, cooperation or relation of the parts, as various changes may be made within the scope of the appended claims.

I claim:

1. A wheel puller comprising a cap and a screw having a threaded engagement with the cap, the threads being specially formed to permit limited axial movement of the screw with respect to the cap without relative rotary movement of the parts.

2. A wheel puller comprising a cap and a screw having a threaded relation, the threads upon the parts being of a special formation in which the threads are narrower than the grooves between the threads, thereby permitting limited axial movement of the screw with respect to the cap without relative rotary movement of the parts.

3. A wheel puller comprising a cap and a screw having a threaded relation with the cap, the threads upon the screw being of such form as to be capable of movement axially of the screw in the grooves between the threads on the cap.

4. A wheel puller comprising a sheet metal cap and a screw having a threaded relation with the cap, the threads upon the screw being of less width than the grooves between the threads upon the cap, thereby permitting limited axial movement of the screw without relative rotary movement of the parts.

In witness whereof I have hereunto set my hand this 20th day of October, 1926.

IRVING C. WOODWARD.